April 18, 1967 H. WEISS 3,315,204

GALVANOMAGNETIC SEMICONDUCTOR DEVICE

Filed Nov. 18, 1964 3 Sheets-Sheet 1

United States Patent Office 3,315,204

Patented Apr. 18, 1967

3,315,204

GALVANOMAGNETIC SEMICONDUCTOR DEVICE

Herbert Weiss, Nurnberg, Germany, assignor to Siemens-Schuckertwerke Aktiengesellschaft, Berlin-Siemensstadt, Germany, a corporation of Germany Filed Nov. 18, 1964, Ser. No. 412,078

Claims priority, application Germany, Nov. 30, 1963, S 88,506

5 Claims. (Cl. 338—32)

My invention relates to galvanomagnetic devices with semiconducting resistance probes for sensing or measuring magnetic fields.

When a galvanomagnetic resistance device, such as a semiconductor device of the type usually called "field plate", is placed into the air gap of an electromagnet, the resistance of the member varies with the magnetic excitation, and hence with the ampere turns of the magnet, in accordance with a square law up to an approximate limit of $0.6 \cdot 10^{-3}$ ampere turns and, at higher values of excitation, continues to vary in approximately linear proportion to the ampere turns.

It is often desirable, however, to have a linear dependence of the galvanomagnetic resistance upon the excitation of the electromagnet substantially throughout the entire range from lowest to highest available ampere turns. It would also be of advantage if the initial sensitivity, that is the sensitivity of the galvanomagnetic probe to field-strength values in the vicinity of zero, could be increased. The present invention has for its objects to achieve the just-mentioned improvements.

According to the invention, the air gap of the magnetizable field structure, in which the galvanomagnetic semiconductor resistance member is located, has about 30 to about 50% of its width filled with a mass of oxidic ferrite having a saturation considerably lower than that of the magnet core. This establishes a substantially linear relation between the resistance of the galvanomagnetic member or field plate and the ampere turns of the electromagnet and simultaneously increases the initial sensitivity of the galvanomagnetic member.

Acocrding to another, more specific feature of the invention, the mass of magnetically soft ferrite is applied in form of a rigid ferrite plate. This plate may either form a rigid substrate for the semiconductor layer that constitutes the galvanomagnetic probe member proper, or it may be placed or cemented against an insulating, preferably ceramic base plate upon which the galvanomagnetic semiconductor member proper is disposed. By placing such a ferrite plate into the field gap of the electromagnetic, the effective gap is reduced up to saturation of the ferrite occurring at approximately 3 to 4 kilo Gauss, corresponding to approximately $0.6 \cdot 10^{-3}$ ampere turns. The dimensions and the saturation induction of the ferrite plate can be readily so chosen that the resistance of the galvanomagnetic probe begins to vary in proportion to the magnetic excitation at very small values of excitation.

The invention will be further described with reference to an embodiment illustrated by way of example in the accompanying drawings, wherein.

Figure 1:
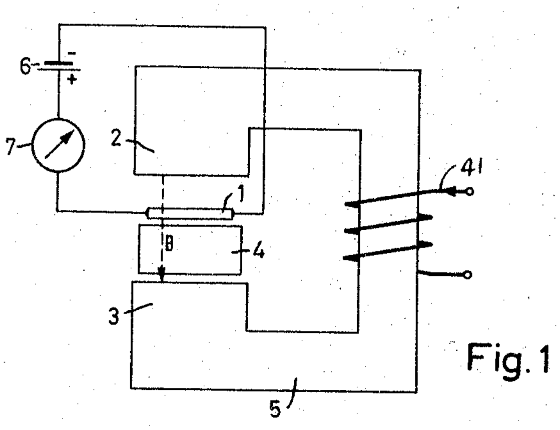
FIG. 1 shows schematically a galvanomagnetic device according to the invention, the vertical width of the field gap and of the parts located therein being shown exaggerated and in somewhat exploded fashion.

According to FIG. 1, a field plate 1, formed essentially by a galvanomagnetic resistance member of semiconductor material upon a substrate plate of insulating material such as sintered alumina, is located between the pole shoes 2 and 3 of an electromagnet whose preferably laminated core 5 carries an excitation winding 41. Also located in the air gap of the magnet is a ferrite plate 4 which occupies 40% of the gap width. The induction B, indicated by a broken-line arrow, of the magnet is excited or provided by the current J passing through the excitation coil 41. The semiconductor resistance member of the field plate 1 is connected in series with a voltage source 6 and a measuring instrument 7.

Figure 2:
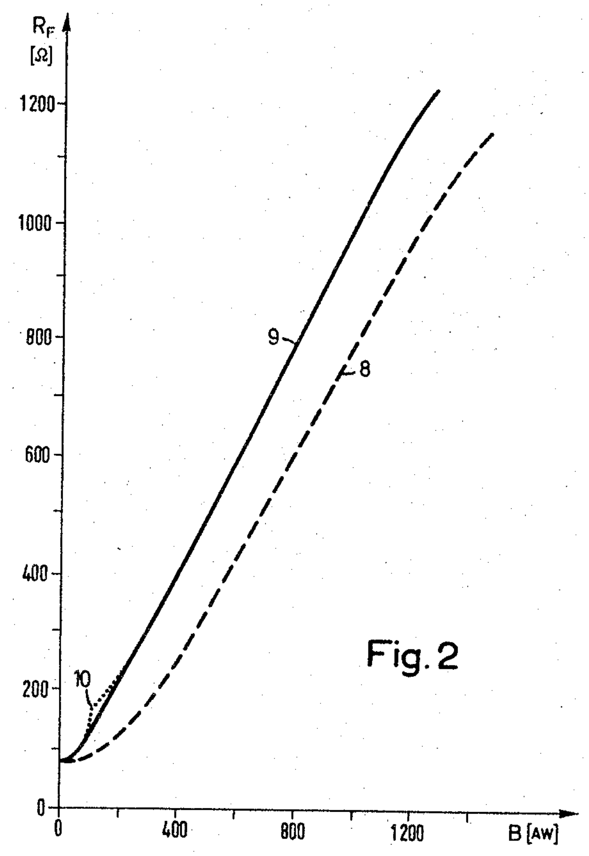
FIG. 2 is an explanatory graph of measuring results obtained with and without a ferrite plate in the air gap.

FIG. 2 is a coordinate diagram showing measuring curves obtained with a device according to FIG. 1, it being understood that the gap of the magnet is actually completely filled by the field plate 1 and the ferrite plate 4, leaving no useless interspaces. The abscissa in FIG. 2 represents the excitation B in ampere turns (AW) of the electromagnet, and the ordinate indicates the resistance $R_F$ of the field plate 1 in ohms. The two curves 8 and 9, therefore, exhibit the relation between the magnetic excitation and the resistance of the field plate. The broken-line curve 8 was obtained without the presence of a ferrite plate. The curve 9 was obtained under the same conditions except that the air gap of the electromagnet was 40% filled with ferrite.

A comparison of curves 8 and 9 in FIG. 2 reveals the following. On the one hand, the beginning of the linear portion of the curve is displaced from about 400 down to about 130 ampere turns by the insertion of the ferrite plate into the air gap. Consequently the minimum excitation current at which the relation between excitation and field plate resistance commenced to become linear was reduced to approximately one-third. On the other hand, the sensitivity of the galvanomagnetic device was considerably increased by the presence of the ferrite in the air gap.

If, for example, 30 to 50% of the space in the field gap is filled with ferrite whose saturation $S_F$ is small relative to the saturation $S_M$ of the magnet core, the linear portion of the excitation-resistance characteristic can be made to commence at even lower excitation values. For example, when $S_F=3000$ Gauss and $S_N=16{,}000$ Gauss, the linear portion of the excitation-resistance curve commences at an excitation of only about two-thirds of that represented by curve 8 in FIG. 2. This is because the curve 9 results from the fact that a share corresponding to the magnetization curve of the ferrite becomes superimposed upon the curve 8. This is the reason why curve 9 is displaced to the left (toward lower excitation values) in comparison with curve 8. It would be fallacious to insert into the air gap a material having an exactly rectangular magnetization characteristic. In such a case, the curve 9 would no longer be uniform, this being indicated by a dotted portion 10 of curve 9. The uniformity of curve 9 is secured by employing ferrites of a more or less flat magnetizing characteristic. Suitable for this purpose are various soft-magnetic ferrites of the spinel (ferroxcube) type such as sintered maganese-iron oxide. At very high magnetic fields, both curves 8 and 9 lose their linearity. This is due to the fact that the magnet core becomes saturated.

When the galvanomagnetic resistor (field plate) is connected to a constant voltage, the current flowing through the semiconductor member is proportional to the reciprocal value of the ampere turns. If the current flowing through the semi-conductor member is kept constant, the voltage is proportional to the product of current times ampere turns.

At excitation values higher than required for saturation of the ferrite, the two curves 8 and 9 extend substantially parallel to each other.

Figure 3:
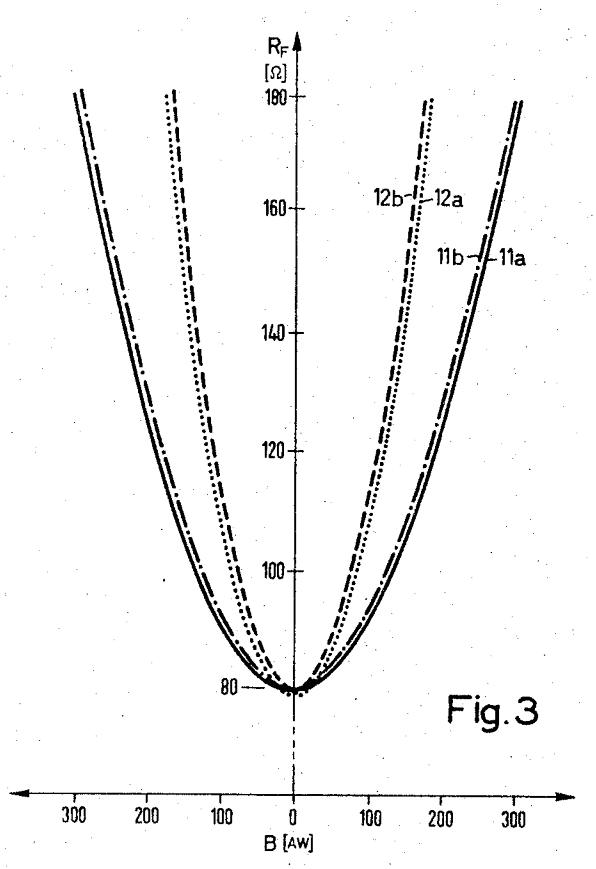
FIG. 3 is a graph showing the lower portion of FIG. 2 on enlarged scale.

FIG. 3 in which the abscissa and ordinate generally denote the same parameters as in FIG. 2, corresponds only to the initial range of curves according to FIG. 2. In addition, the effect of hysteresis for both cases is also represented. Curves 11*a* and 11*b* were measured without ferrite in the air gap, and curves 12*a* and 12*b* with ferrite. It will be recognized that the hysteresis, manifested in FIG. 3 by the distance between curves 11*a* and 11*b*, and by the distance between curves 12*a* and 12*b*, is virtually not enlarged by the presence of the ferrite. The graph of FIG. 3 also shows the considerable extent to which the sensitivity is increased by the use of ferrite. This is apparent from curves 12*a*, 12*b* in comparison with curves 11*a*, 11*b*.

Figure 4:
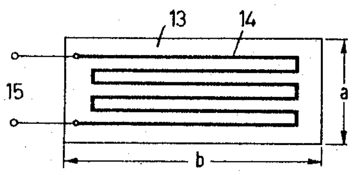
FIG. 4 is a plan view of a galvanomagnetic field plate which may be utilized in the device of FIG. 1.

In the embodiment of the field plate shown in FIG. 4, a substrate or carrier plate 13 is provided with a zig-zag or sinuous-shaped layer 14 which constitutes the galvanomagnetically responsive semiconducting resistor proper. The carrier plate 13 preferably consists of a material whose thermal coefficient of expansion is approximately the same as that of the ferrite. For example, the carrier plate 13 may be made of sintered alumina ($Al_2O_3$). The connecting leads 15 and the semiconductor resistor 14 are preferably covered by a varnish or casting resin such as silicon resin. The semiconductor material may consist of an $A^{III}B^{V}$ compound, preferably indium antimonide (InSb). The temperature coefficient of indium antimonide is approximately $6 \cdot 10^{-6}/° C$. This is close to the thermal coefficient of expansion of sintered alumina, as well as to that of oxidic sintered ferrite which is also available with a temperature coefficient of approximately 5 to $6 \cdot 10^{-6}/° C$. The above-described device, therefore, also exhibits an excellent thermal stability with respect to mechanical properties. In a device made and tested in accordance with the invention, the carrier plate of sintered alumina as well as the ferrite plate each had a length 25 mm. and a width of 10 mm.

Figure 5:
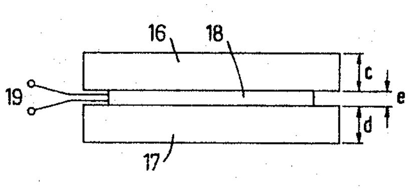
FIG. 5 is a lateral elevation of another field plate which may be utilized in the device of FIG. 1.

As shown in FIG. 5, the ferrite plate 17 may also be firmly cemented to the field plate. In FIG. 5 the carrier plate of sintered alumina is denoted by 16, the galvanomagnetic resistance member by 18 and the appertaining leads by 19. The ferrite plate 17 is firmly joined with the carrier plate in parallel relation thereto. In three devices of this kind made and tested, the carrier plate 16 had a thickness of 0.557 mm., and the ferrite plates 17 had respective thicknesses of 0.5 mm., 1.0 mm. and 1.5 mm. The intermediately located semiconductor member had a thickness of 18$\mu$.

Figure 6:
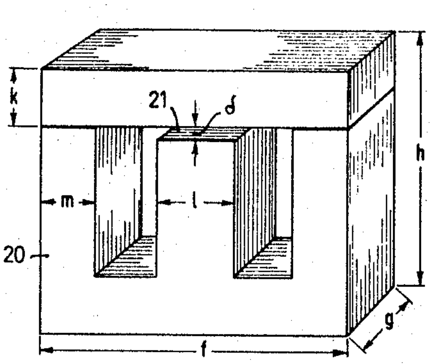
FIG. 6 is a schematic perspective view of a core structure for use with field plates as shown in FIGS. 4 and 5.

Tests were made in the field gap 21 of an electromagnet as shown in FIG. 6. The laminated core structure 20 was made of dynamo sheet metal type IV. The width $d$ of the air gap 21 was 2.5 mm. The excitation coil, not illustrated, was located on the center leg and had 1000 turns of 13-ohm direct-current resistance. The other dimensions indicated in FIG. 6 had the following values: $f$=78 mm., $g$.=27 mm., $h$= 65 mm., $k$= 13 mm., $L$=26 mm. and $m$=13 mm. The diagram shown in FIG. 7 indicates as the ordinate the galvanomagnetic resistance $R_F$ in ohms as a function of the excitation B indicated as the abscissa in ampere turns (AW). Curve 22 was taken with the aid of a field plate without ferrite according to FIG. 4 having the composition and dimensions described in the foregoing. Curve 23 was obtained with a field plate according to FIG. 5 having a ferrite plate of 0.5 mm. thickness inserted into the air gap. Curves 24 and 25 resulted from measurements made with field plates according to FIG. 5 in which the ferrite plates have respective thickness of 1.0 and 1.5 mm.

Figure 7:
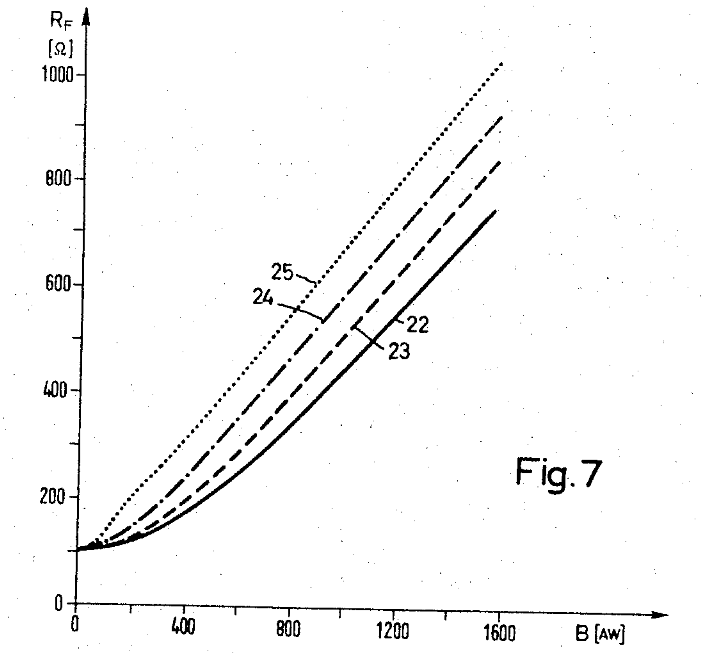
FIG. 7 is a graph representing measuring curves for respectively different thicknesses of the field plate.

It is apparent from FIG. 7 that the desired linear course of the relation between $R_F$ and B expands downwardly from curve 22 and curve 23 and again to curve 24, whereas the next following curve 25 appears to be less straight than curve 24. Consequently, in the series of measurements represented by the curve 25, the ferrite filled to large a shart of the gap width. It was found that the best linearization of the relation between galvanomagnetic resistance and electromagnetic excitation is obtained if approximately 30 to 50% of the field-gap width are filled with ferrite.

Figure 8:
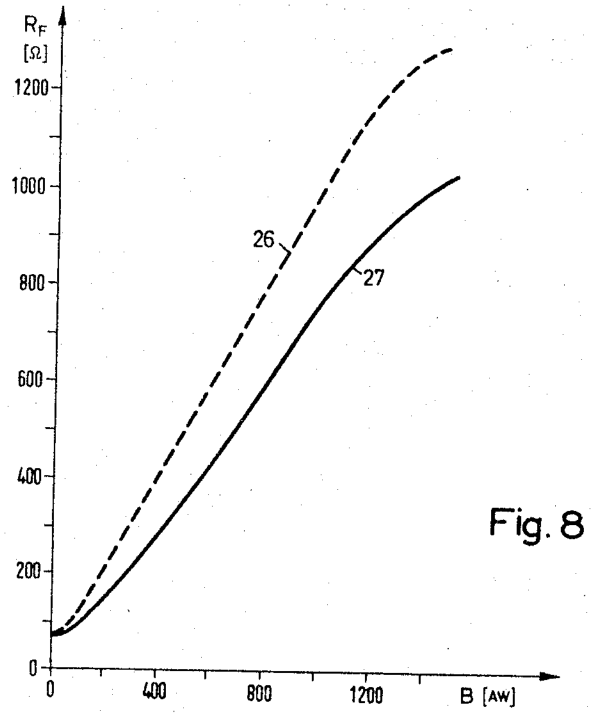
FIG. 8 is a graph relating to the dependence of the galvanomagnetic resistance upon temperature.

The diagram shown in FIG. 8 represents an example of test results from investigations relating to the dependence of the galvanomagnetic response upon changes in temperature in a device according to the invention. The measurements from which the curves 26 and 27 in FIG. 8 resulted, were made with an electromagnet whose air gap had a width of 1.5 mm. A carrier plate with a ferrite plate of 0.580 mm. thickness was inserted into the gap. The abscissa in FIG. 8 indicates magnetic excitation B in ampere turns and the ordinate indicates field plate resistance $R_F$ in ohms. Curve 26 shows the measuring results for 25° C., and curve 27 the corresponding results for 60° C. The differences between the two curves stem not only from the temperature dependence of the semiconductor material but also from the strong temperature-dependent variation in permeability of the ferrite and of the core sheet material. The temperature dependence in the linear portion of both curves 26, 27 in FIG. 8 is between 0.6 and 0.7% per ° C.

Galvanomagnetic resistance devices according to the invention, on account of their high sensitivity in low magnetic fields and their linear relation between magnetic field and galvanomagetic resistance, are advantageously applicable for a great variety of purposes, particularly for multiplication and division operations in equipment for electronic controlling and regulating purposes. A device according to the invention may serve, for example, to furnish control currents for Hall generators where the source of primary current is to be galvanicaly isolated from the Hall generators.

I claim:

1. A galvanomagnetic device, comprising a magnetizable core structure having an air gap formed therein of a determined distance, said core structure having a determined saturation point, a galvanomagnetic semiconductor resistance member and a mass of oxidic ferrite jointly filling said gap in magnetic series relation, said ferrite mass filling 30 to 50% of the determined distance of said air and having a saturation point which is considerably lower than that of said core structure, said ferrite having a substantially flat magnetization characteristic.

2. A galvanomagnetic device, comprising a laminated core structure of soft-magnetic metal forming a substantially closed magnetic circuit, said core structure having an air gap formed therein of a determined distance, said core structure having a determined saturation point, a galvanomagnetic semiconductor resistance member and a plate of sintered ceramic ferrite disposed in said gap in magnetic series relation, said ferrite filling 30 to 50% of the determined distance of said air gap and having a saturation point which is considerably lower than that of said core structure, said ferrite having a substantialy flat magnetization characteristic.

3. A galvanomagnetic device, comprising a magnetizable core structure having an air gap formed therein of a determined distance, said core structure having a determined saturation point, a galvanomagnetic semiconductor resistance member and a plate of sintered ceramic ferrite disposed in said gap and cemented to each other, the thickness of said plate being 30 to 50% of the determined distance of said air gap, and said ferrite plate having a saturation point which is considerably lower than that of said core structure, said ferrite having a substantially flat magnetization characteristic.

4. A galvanomagnetic device according to claim 1, comprising an insulating ceramic carrier plate in said gap, said semiconductor member being sinuous-shaped and mounted on said carried plate, and said mass of ferrite comprising a second plate parallel to said carried plate.

5. A galvanomagnetic device according to claim 1, comprising two sintered ceramic plates on opposite sides of said semiconductor resistance member in said gap, said two plates and said member being bonded together, and at least one of said two plates being formed of said ferrite mass of lower saturation point than said core structure.

References Cited by the Examiner

UNITED STATES PATENTS

| | | | |
|---|---|---|---|
| 3,042,887 | 7/1962 | Kuhrt et al. | 324—46 |
| 3,172,032 | 3/1965 | Hunt | 324—46 |

FOREIGN PATENTS

| | | |
|---|---|---|
| 1,098,581 | 2/1961 | Germany. |

WALTER L. CARLSON, *Primary Examiner.*

R. J. CORCORAN, R. V. ROLINEC, *Assistant Examiners.*